(12) United States Patent
Garcia

(10) Patent No.: US 11,523,165 B1
(45) Date of Patent: Dec. 6, 2022

(54) TELEVISION REMOTE FINDER ASSEMBLY

(71) Applicant: Albert Garcia, San Antonio, TX (US)

(72) Inventor: Albert Garcia, San Antonio, TX (US)

( * ) Notice: Subject to any disclaimer, the term of this patent is extended or adjusted under 35 U.S.C. 154(b) by 0 days.

(21) Appl. No.: 17/388,778

(22) Filed: Jul. 29, 2021

(51) Int. Cl.
  *H04N 21/41* (2011.01)
  *H04N 21/422* (2011.01)
  *G08B 21/24* (2006.01)
  *H04W 4/80* (2018.01)

(52) U.S. Cl.
  CPC ....... *H04N 21/41265* (2020.08); *G08B 21/24* (2013.01); *H04N 21/42222* (2013.01); *H04W 4/80* (2018.02)

(58) Field of Classification Search
  None
  See application file for complete search history.

(56) References Cited

U.S. PATENT DOCUMENTS

| | | | |
|---|---|---|---|
| 5,677,664 A * | 10/1997 | Sawinski | ............ B60R 25/1003 340/425.5 |
| 5,680,105 A | 10/1997 | Hedrick | |
| 6,674,364 B1 | 1/2004 | Holbrook | |
| 6,774,787 B1 | 8/2004 | Melbourne | |
| 8,847,754 B2 | 9/2014 | Buchheim | |
| 9,614,953 B1 | 4/2017 | Bakhoum | |
| 2004/0017293 A1* | 1/2004 | Webster | ................. G08B 21/24 340/539.32 |
| 2007/0279245 A1* | 12/2007 | Sholem | ................. H01H 9/025 211/26.1 |
| 2010/0130096 A1* | 5/2010 | Baarman | ................. A63H 18/12 446/444 |
| 2011/0310311 A1* | 12/2011 | Nakamura | ............. H04N 5/655 348/E5.135 |

FOREIGN PATENT DOCUMENTS

WO      WO8201780      5/1982

\* cited by examiner

*Primary Examiner* — Samira Monshi

(57) ABSTRACT

A television remote finder assembly for locating a misplaced remote control includes a television that has a communication unit integrated into the television. The communication unit broadcasts an alert signal when the communication unit is actuated. A remote control is in wireless communication with the television for controlling operational parameters of the television. The remote control receives the alert signal when the communication unit in the television is actuated. Additionally, the remote control includes an alarm that is integrated into the remote control. The alarm is actuated when the remote control receives the alert signal to emit an audible alert thereby facilitating the user to locate the remote control when the remote control has been misplaced.

4 Claims, 3 Drawing Sheets

TELEVISION REMOTE FINDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to remote finder devices and more particularly pertains to a new remote finder device for locating a misplaced remote control. The device includes a television that includes a transmitter and a locate button. The device additionally includes a remote control which includes a receiver, a speaker and an off button. The transmitter broadcasts an alert signal when the locate button is depressed and the speaker in the remote control is turned on when the receiver receives the alert signal from the transmitter. The speaker is turned off when the remote control is located and the off button is depressed.

(2) Description of Related Art Including Information Disclosed Under 37 CFR 1.97 and 1.98

The prior art relates to remote finder devices including a variety of location devices for locating a misplaced electronic device. In each case the device includes a transmitter which broadcasts an encoded signal and an electronic device that can receive the encoded signal and which emits an audible sound for locating the electronic device. The prior art discloses device location method that includes a signal strength indicator for measuring signal strength of an electronic component and which can be tracked by a mobile computing device. The prior art discloses an electronic object locator that includes a search signal broadcast by a controller and a found signal broadcast by an electronic device. The prior art discloses a key fob which can communicate with a smart phone via Bluetooth communication.

BRIEF SUMMARY OF THE INVENTION

An embodiment of the disclosure meets the needs presented above by generally comprising a television that has a communication unit integrated into the television. The communication unit broadcasts an alert signal when the communication unit is actuated. A remote control is in wireless communication with the television for controlling operational parameters of the television. The remote control receives the alert signal when the communication unit in the television is actuated. Additionally, the remote control includes an alarm that is integrated into the remote control. The alarm is actuated when the remote control receives the alert signal to emit an audible alert thereby facilitating the user to locate the remote control when the remote control has been misplaced.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
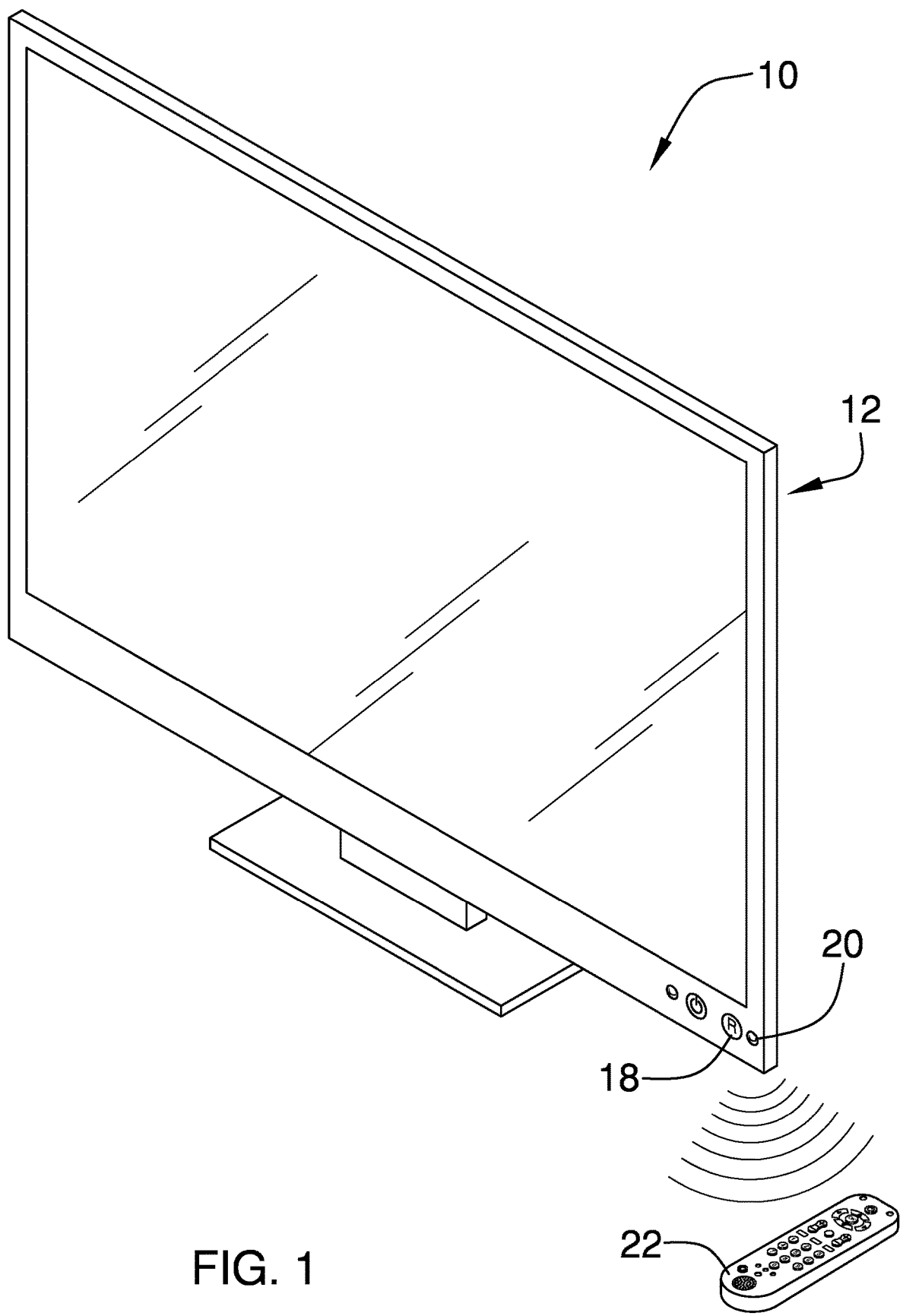
FIG. 1 is a perspective view of a television remote finder assembly according to an embodiment of the disclosure.
Figure 2:
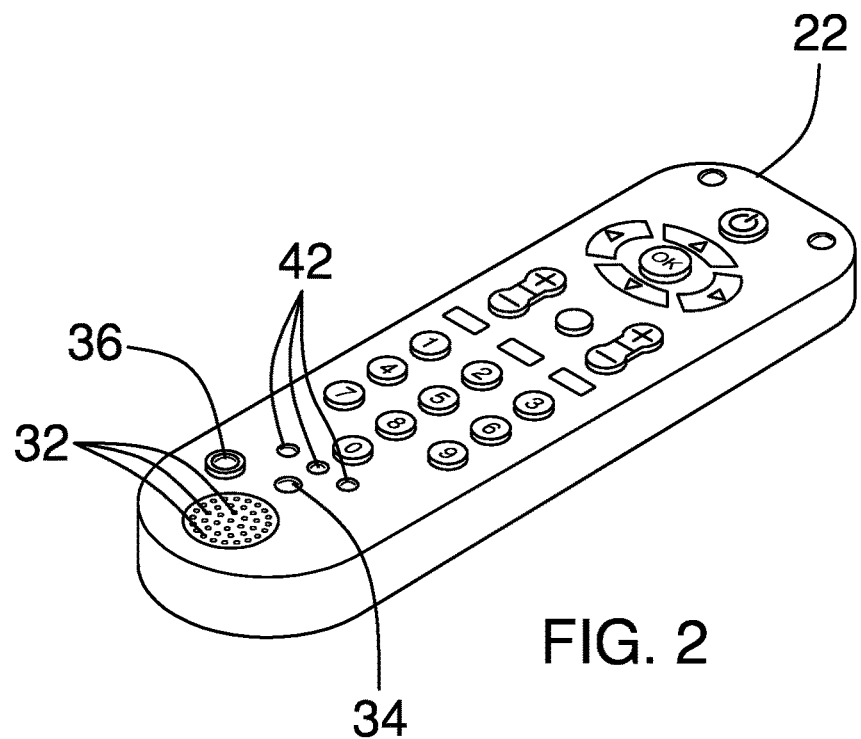
FIG. 2 is a perspective view of a remote control of an embodiment of the disclosure.
Figure 3:
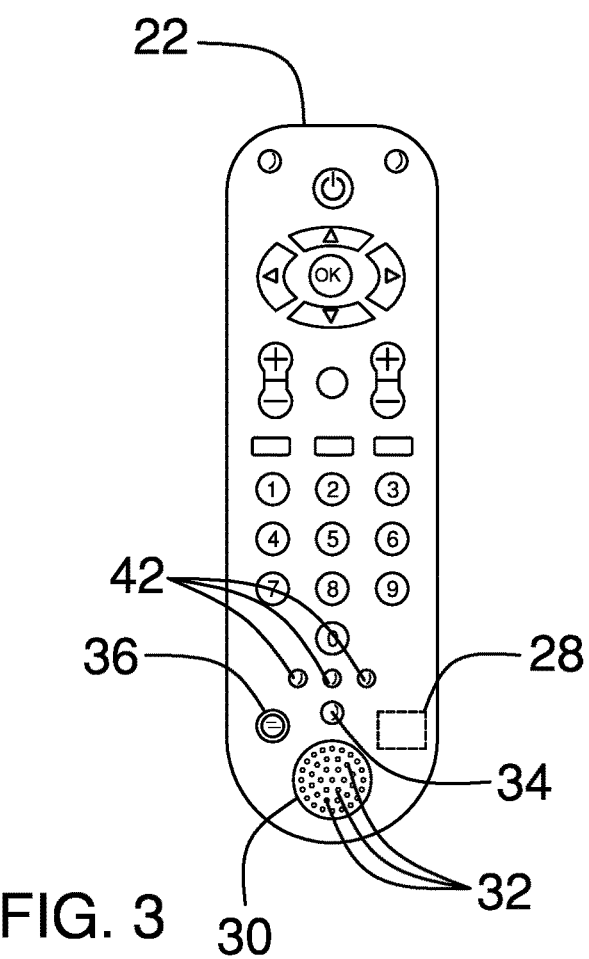
FIG. 3 is a top view of a remote control of an embodiment of the disclosure.
Figure 4:
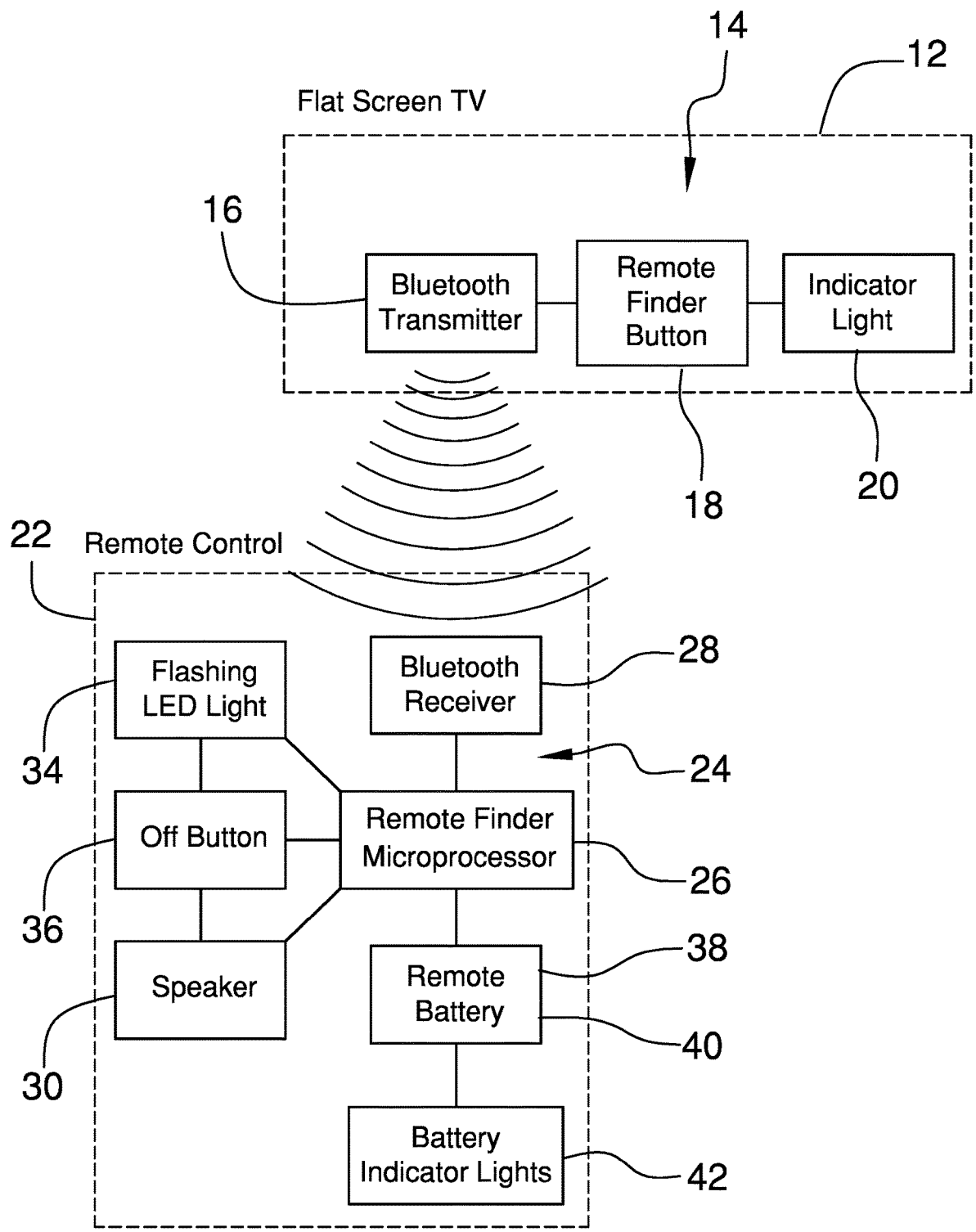
FIG. 4 is a schematic view of an embodiment of the disclosure.

With reference now to the drawings, and in particular to FIGS. 1 through 4 thereof, a new remote finder device embodying the principles and concepts of an embodiment of the disclosure and generally designated by the reference numeral 10 will be described.

As best illustrated in FIGS. 1 through 4, the television remote finder assembly 10 generally comprises a television 12 that has a communication unit 14 which is integrated into the television 12. The communication unit 14 broadcasts an alert signal when the communication unit 14 is actuated. The television 12 may be a flat screen television that incorporates a liquid crystal display or any other type of television that displays imagery received from an electronic source. The communication unit 14 comprises a transmitter 16 that is integrated into the television 12 and the transmitter 16 is electrically coupled to control circuitry in the television 12. Furthermore, the transmitter 16 broadcasts the alert signal when the transmitter 16 is actuated. The transmitter 16 may comprise a radio frequency transmitter or the like and the transmitter 16 may employ Bluetooth communication protocols.

The communication unit 14 includes a locator button 18 that is movably integrated into the television 12 such that the locator button 18 is accessible to a user. The locator button 18 is electrically coupled to the transmitter 16 and the transmitter 16 is actuated to broadcast the alert signal when the locator button 18 is depressed. The communication unit 14 further includes a first light emitter 20 that is integrated into the television 12 to emit light outwardly from the television 12. The first light emitter 20 is electrically coupled to the locator button 18 and the first light emitter 20 is turned on when the locator button 18 is depressed. In this way the first light emitter 20 visually alerts the user that the transmitter 16 is broadcasting the alert signal. The first light emitter 20 may comprise a light emitting diode or other type of electronic light emitter.

A remote control 22 is provided that is in wireless communication with the television 12 for controlling operational parameters of the television 12. The remote control 22 receives the alert signal when the communication unit 14 in the television 12 is actuated. Additionally, the remote control 22 includes an alarm 24 that is integrated into the remote control 22, and the alarm 24 is actuated when the remote control 22 receives the alert signal. In this way the alarm 24 can emit an audible alert to facilitate the user to locate the remote control 22 when the remote control 22 has been misplaced. The remote control 22 may include control buttons that are common to television remote controls, including but not being limited to, power on and off, volume up, volume down, channel up and channel down.

The alarm 24 comprises a control circuit 26 that is integrated into the remote control 22 and the control circuit 26 receives an on input and an off input. The alarm 24 includes a receiver 28 that is integrated into the remote control 22 and the receiver 28 is in wireless communication with the transmitter 16. The receiver 28 receives the alert signal from the transmitter 16 and the control circuit 26 receives the on input when the receiver 28 receives the alert signal from the transmitter 16. The receiver 28 may comprise a radio frequency receiver or the like and the receiver 28 may employ Bluetooth communication protocols.

The alarm 24 includes a speaker 30 that is integrated into the remote control 22 to emit an audible alert outwardly from the remote control 22. Additionally, the remote control 22 has a plurality of speaker openings 32 each extending into an interior of the remote control 22 and the speaker 30 is aligned with the plurality of speaker openings 32. The speaker 30 is electrically coupled to the control circuit 26 and the speaker 30 is turned on when the control circuit 26 receives the on input. Conversely, the speaker 30 is turned off when the control circuit 26 receives the off input. The speaker 30 may comprise an electronic speaker of any conventional design that is capable of emitting sound at a volume level that is audible to the human ear from a distance of at least 100.0 feet.

The alarm 24 includes a second light emitter 34 that is integrated into the remote control 22 to emit light outwardly from the remote control 22. In this way the user can visually identify the location of the remote control 22. The second light emitter 34 is turned on when the control circuit 26 receives the on input and the second light emitter 34 is turned off when the control circuit 26 receives the off input. Furthermore, the second light emitter 34 continuously flashes on and off when the second light emitter 34 is turned on to enhance visibility of the remote control 22 for the user. The second light emitter 34 may comprise a light emitting diode or other type of electronic light emitter.

The alarm 24 includes an off button 36 is movably integrated into the remote control 22 such that the off button 36 is accessible to the user. The off button 36 is electrically coupled to the control circuit 26 and the control circuit 26 receives the off input when the off button 36 is depressed. The alarm 24 includes a power supply 38 that is integrated into the remote control 22 and the power supply 38 is electrically coupled to the control circuit 26. The power supply 38 comprises a battery 40 that is positioned in the remote control 22 and the battery 40 is electrically coupled to the control circuit 26.

The power supply 38 includes a plurality of battery light emitters 42 that is each integrated into the remote control 22 to emit light outwardly from the remote control 22. Each of the battery light emitters 42 is electrically coupled to the battery 40. Furthermore, each of the plurality of battery light emitters 42 is sequentially turned on to visually communicate a charge level of the battery 40 ranging between a minimum charge and a maximum charge. Each of the battery light emitters 42 may comprise a light emitting diode or other type of electronic light emitter.

In use, the locator button 18 on the television 12 is depressed when the remote control 22 has been misplaced. In this way the speaker 30 is actuated to emit the audible alert and the second light emitter 34 repeatedly flashes on and off. In this way the remote control 22 can be located by listening for the audible alert and by looking for the flashing light. The off button 36 on the remote control 22 is depressed when the remote control 22 is located thereby turning off the speaker 30 and the second light emitter 34. Thus, the remote control 22 can be located and subsequently silenced each time the remote control 22 is misplaced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A television remote finder assembly for locating a remote control for a television when the remote control has been misplaced, said assembly comprising:
 a television having a communication unit being integrated into said television, said communication unit broadcasting an alert signal when said communication unit is actuated;
 a remote control being in wireless communication with said television for controlling operational parameters of said television, said remote control receiving said alert signal when said communication unit in said television is actuated, said remote control including an alarm being integrated into said remote control, said alarm being actuated when said remote control receives said alert signal wherein said alarm is configured to emit an audible alert to facilitate the user to locate said remote control when said remote control has been misplaced; wherein said communication unit comprises:

a transmitter being integrated into said television, said transmitter being electrically coupled to control circuitry in said television, said transmitter broadcasting said alert signal when said transmitter is actuated;

a locator button being movably integrated into said television wherein said locator button is configured to be accessible to a user, said locator button being electrically coupled to said transmitter, said transmitter being actuated to broadcast said alert signal when said locator button is depressed; and a first light emitter being integrated into said television wherein said first light emitter is configured to emit light outwardly from said television, said first light emitter being electrically coupled to said locator button, said first light emitter being turned on when said locator button is depressed wherein said first light emitter is configured to visually alert the user that said transmitter is broadcasting said alert signal; and wherein said alarm comprises:

a control circuit being integrated into said remote control, said control circuit receiving an on input and an off input;

a receiver being integrated into said remote control, said receiver being in wireless communication with said transmitter, said receiver receiving said alert signal from said transmitter, said control circuit receiving said on input when said receiver receives said alert signal from said transmitter; and an off button being movably integrated into said remote control wherein said off button is configured to be accessible to the user, said off button being electrically coupled to said control circuit, said control circuit receiving said off input when said off button is depressed.

2. The assembly according to claim 1, wherein said alarm comprises a speaker being integrated into said remote control wherein said speaker is configured to emit an audible alert outwardly from said remote control, said remote control having a plurality of speaker openings each extending into an interior of said remote control, said speaker being aligned with said plurality of speaker openings, said speaker being electrically coupled to said control circuit, said speaker being turned on when said control circuit receives said on input, said speaker being turned off when said control circuit receives said off input.

3. The assembly according to claim 1, wherein said alarm comprises a second light emitter being integrated into said remote control wherein said second light emitter is configured to emit light outwardly from said remote control thereby facilitating the user to visually identify the location of said remote control, said second light emitter being turned on when said control circuit receives said on input, said second light emitter being turned off when said control circuit receives said off input, said second emitter continuously flashing on and off when said second light emitter is turned on wherein said second light emitter is configured to enhance visibility of said remote control for the user.

4. A television remote finder system for locating a remote control for a television when the remote control has been misplaced, said system comprising:

a television having a communication unit being integrated into said television, said communication unit broadcasting an alert signal when said communication unit is actuated, said communication unit comprising:

a transmitter being integrated into said television, said transmitter being electrically coupled to control circuitry in said television, said transmitter broadcasting said alert signal when said transmitter is actuated;

a locator button being movably integrated into said television wherein said locator button is configured to be accessible to a user, said locator button being electrically coupled to said transmitter, said transmitter being actuated to broadcast said alert signal when said locator button is depressed; and a first light emitter being integrated into said television wherein said first light emitter is configured to emit light outwardly from said television, said first light emitter being electrically coupled to said locator button, said first light emitter being turned on when said locator button is depressed wherein said first light emitter is configured to visually alert the user that said transmitter is broadcasting said alert signal; and a remote control being in wireless communication with said television for controlling operational parameters of said television, said remote control receiving said alert signal when said communication unit in said television is actuated, said remote control including an alarm being integrated into said remote control, said alarm being actuated when said remote control receives said alert signal wherein said alarm is configured to emit an audible alert to facilitate the user to locate said remote control when said remote control has been misplaced, said alarm comprising:

a control circuit being integrated into said remote control, said control circuit receiving an on input and an off input;

a receiver being integrated into said remote control, said receiver being in wireless communication with said transmitter, said receiver receiving said alert signal from said transmitter, said control circuit receiving said on input when said receiver receives said alert signal from said transmitter;

a speaker being integrated into said remote control wherein said speaker is configured to emit an audible alert outwardly from said remote control, said remote control having a plurality of speaker openings each extending into an interior of said remote control, said speaker being aligned with said plurality of speaker openings, said speaker being electrically coupled to said control circuit, said speaker being turned on when said control circuit receives said on input, said speaker being turned off when said control circuit receives said off input;

a second light emitter being integrated into said remote control wherein said second light emitter is configured to emit light outwardly from said remote control thereby facilitating the user to visually identify the location of said remote control, said second light emitter being turned on when said control circuit receives said on input, said second light emitter being turned off when said control circuit receives said off input, said second emitter continuously flashing on and off when said second light emitter is turned on wherein said second light emitter is configured to enhance visibility of said remote control for the user;

an off button being movably integrated into said remote control wherein said off button is configured to be accessible to the user, said off button being electrically coupled to said control circuit, said control circuit receiving said off input when said off button is depressed; and a power supply being integrated into said remote control, said power supply being electrically coupled to said control circuit, said power supply comprising:

a battery being positioned in said remote control, said battery being electrically coupled to said control circuit; and a plurality of battery light emitters, each of said battery light emitters being integrated into said remote control wherein each of said battery light emitters is configured to emit light outwardly from said remote control, each of said battery light emitters being electrically coupled to said battery, each of said plurality of light emitters being sequentially turned on to visually communicate a charge level of said battery ranging between a minimum charge and a maximum charge.

* * * * *